(12) United States Patent
Pleli

(10) Patent No.: US 12,358,128 B2
(45) Date of Patent: Jul. 15, 2025

(54) MODULAR ROBOT CONTROL ARCHITECTURE

(71) Applicant: Rivian IP Holdings, LLC, Plymouth, MI (US)

(72) Inventor: Matthew Pleli, Castro Valley, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 335 days.

(21) Appl. No.: 17/824,969

(22) Filed: May 26, 2022

(65) Prior Publication Data

US 2023/0405810 A1 Dec. 21, 2023

(51) Int. Cl.
*G06F 17/00* (2019.01)
*B25J 9/16* (2006.01)

(52) U.S. Cl.
CPC ............. *B25J 9/161* (2013.01); *B25J 9/1656* (2013.01)

(58) Field of Classification Search
CPC ......... B25J 9/161; B25J 9/1656; B25J 9/1602
USPC ....................................................... 700/245
See application file for complete search history.

(56) References Cited

U.S. PATENT DOCUMENTS

| | | | |
|---|---|---|---|
| 8,667,475 B2* | 3/2014 | Chang | G05B 19/408 717/136 |
| 10,613,520 B2* | 4/2020 | Ueno | B25J 9/1656 |
| 11,198,219 B2* | 12/2021 | Ojima | B25J 9/1656 |
| 2014/0364989 A1* | 12/2014 | Hosaka | G05B 19/41825 901/50 |
| 2016/0349739 A1* | 12/2016 | Satake | G05B 19/4083 |
| 2018/0264651 A1* | 9/2018 | Ojima | B25J 9/1602 |

OTHER PUBLICATIONS

Automated Tool Path Planning for Industrial Robot in Material Handling in Warehouse Automation (Year: 2018).*

* cited by examiner

*Primary Examiner* — Ronnie M Mancho
(74) *Attorney, Agent, or Firm* — Foley & Lardner LLP

(57) ABSTRACT

A robot is disclosed. The robot includes at least one robot component and a controller. The controller is configured to control the at least one robot component based at least on: (1) an Input/Output (I/O) map comprising a plurality of blocks that are each associated with predefined inputs and outputs; and (2) an application associated with at least one block of the plurality of blocks, the application executes the associated predefined inputs and outputs to control the at least one robot component.

20 Claims, 4 Drawing Sheets

MODULAR ROBOT CONTROL ARCHITECTURE

INTRODUCTION

The present disclosure relates generally to the automotive and manufacturing fields. More particularly, the present disclosure relates to a robot and a control architecture thereof that includes an Input/Output (I/O) map and associated applications.

Original Equipment Manufacturers (OEMs) for robots generally require that vendors change the inputs and outputs of their devices to fit into their existing I/O maps for the control of robots, along with the tooling and processes thereof, during manufacturing processes. This often results in the need to add to and/or update I/O maps of robots and robot systems based on a variety of factors, including which applications will be installed to control the robot and the tooling of the robot and which OEM provides the robot and/or tooling.

The present introduction is provided as illustrative environmental context only and should not be construed as being limiting in any manner. It will be readily apparent to those of ordinary skill in the art that the concepts and principles of the present disclosure may be applied in other environmental contexts equally.

SUMMARY

The present disclosure provides a robot with an associated control architecture for a robot system, such as a robot system used to manufacture vehicles. The robot/robot system includes an I/O map that defines multiple blocks. Each of the multiple blocks includes predefined inputs and outputs used for controlling components of the robot, such as an arm of the robot and tooling connected to the arm. The inputs and outputs for each block are grouped together. Each block is also configured for use by one application. Each application for the controller is configured to utilize the inputs and outputs of any block associated therewith, which association can be made during an onboarding process of the applications and any associated tooling. With this modular configuration of the I/O map and applications, the applications can be dynamically placed and can be placed in any order (associated with any of the blocks). Thus, the applications are stackable and interchangeable. As a result, the I/O map does not need to be updated or changed when configuring or reconfiguring the robot/robot system with applications and tooling.

In one illustrative embodiment, the present disclosure provides a robot. The robot includes at least one robot component and a controller. The controller is configured to control the at least one robot component based at least on: (1) an I/O map comprising a plurality of blocks that are each associated with predefined inputs and outputs; and (2) an application associated with at least one block of the plurality of blocks, the application executes the associated predefined inputs and outputs to control the at least one robot component.

In another illustrative embodiment, the present disclosure provides a controller for a robot. The controller includes one or more processors and memory. The memory stores computer-executable instructions. The computer-executable instructions include an Input/Output (I/O) map comprising a plurality of blocks that are each associated with predefined inputs and outputs, and an application associated with at least one block of the plurality of blocks. When the application is executed, the computer-executable instructions cause the one or more processors to control at least one robot component of the robot utilizing the associated predefined inputs and outputs In a further illustrative embodiment, the present disclosure provides a method for configuring a robot. The method includes providing an Input/Output (I/O) map, to the robot, the I/O map comprising a plurality of blocks that are each associated with predefined inputs and outputs. The method also includes associating an application with at least one block of the plurality of blocks. The application executes the associated predefined inputs and outputs to control at least one robot component of the robot

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, in various embodiments, the present disclosure relates to a robot with associated control architecture for a robot system, such as a robot system used to manufacture vehicles. The robot/robot system includes an I/O map that defines multiple blocks. Each of the multiple blocks includes predefined inputs and outputs used for controlling components of the robot, such as an arm of the robot and tooling connected to the arm. The inputs and outputs for each block are grouped together. Each block is also configured for use by one application. While each block is configured for use by a singular application, each block is configured to work with any application available for use with the robot/robot system (but can only be associated with one application at any given time).

Each application for the controller is configured to utilize the inputs and outputs of any block associated therewith, which association can be made during an onboarding process of the applications and any associated tooling. Larger applications, which require more inputs and outputs for communication, are configured to be associated with multiple blocks. With this modular configuration of the I/O map and applications available for use with the robot/robot system, the applications can be dynamically placed and can be placed in any order (associated with any of the blocks). Thus, the applications are stackable and interchangeable. As a result, the I/O map does not need to be updated or changed when configuring or reconfiguring the robot/robot system with applications and tooling, but rather, associations between the applications and the blocks are made to configure the inputs and outputs utilized by each application.

Figure 1:
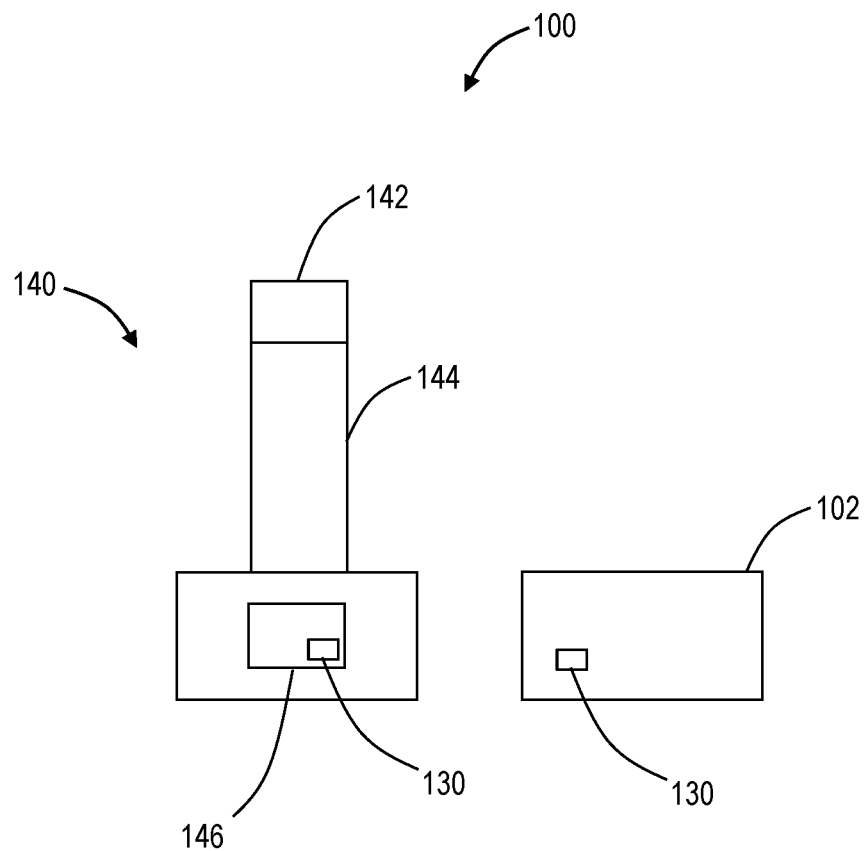
FIG. 1 is a schematic illustration of one illustrative embodiment of a robot system for a manufacturing process of the present disclosure.

FIG. 1 is a schematic illustration of one illustrative embodiment of a robot system 100 for a manufacturing process of the present disclosure. The robot system 100 includes a robot 140 and a system controller 102. The robot 140 includes a robot controller 146 and various components, such as an arm 144 and tooling 142. The arm 144 is configured to move and perform tasks for the manufacturing process.

In embodiments, the tooling 142 includes one or more tools configured to couple to the arm and utilized thereby to perform tasks during the manufacturing process. In embodiments, the tools are chosen from a servo spot welder, dispenser, self-piercing rivet henrob tool, flow drill screw, clinch, mig welder, drawn arc stud tool, self-piercing stud tool, a bolt tool, and the like.

The robot controller 146 is configured to control the arm 144 and the tooling 142, and in particular, to control the arm 144 and the tooling 142 to perform the tasks during the manufacturing process. In embodiments, the robot controller 146 is integrated within the robot 140.

The system controller 102 is an industrial computer, such as a Programmable Logic Controller (PLC), that is configured to communicate with the robot, such as to provide instructions to the robot 140 and receive feedback from the robot 140, such as via communication with the robot controller 146.

The robot system 100 includes an I/O map 130. In embodiments, the I/O map 130 is application based and defines the inputs and outputs for the applications that the robot controller 146 utilizes to control components of the robot, such as the arm 144 and the tooling 142 and that the robot 140 utilizes to communicate with the system controller 102.

Figure 2:
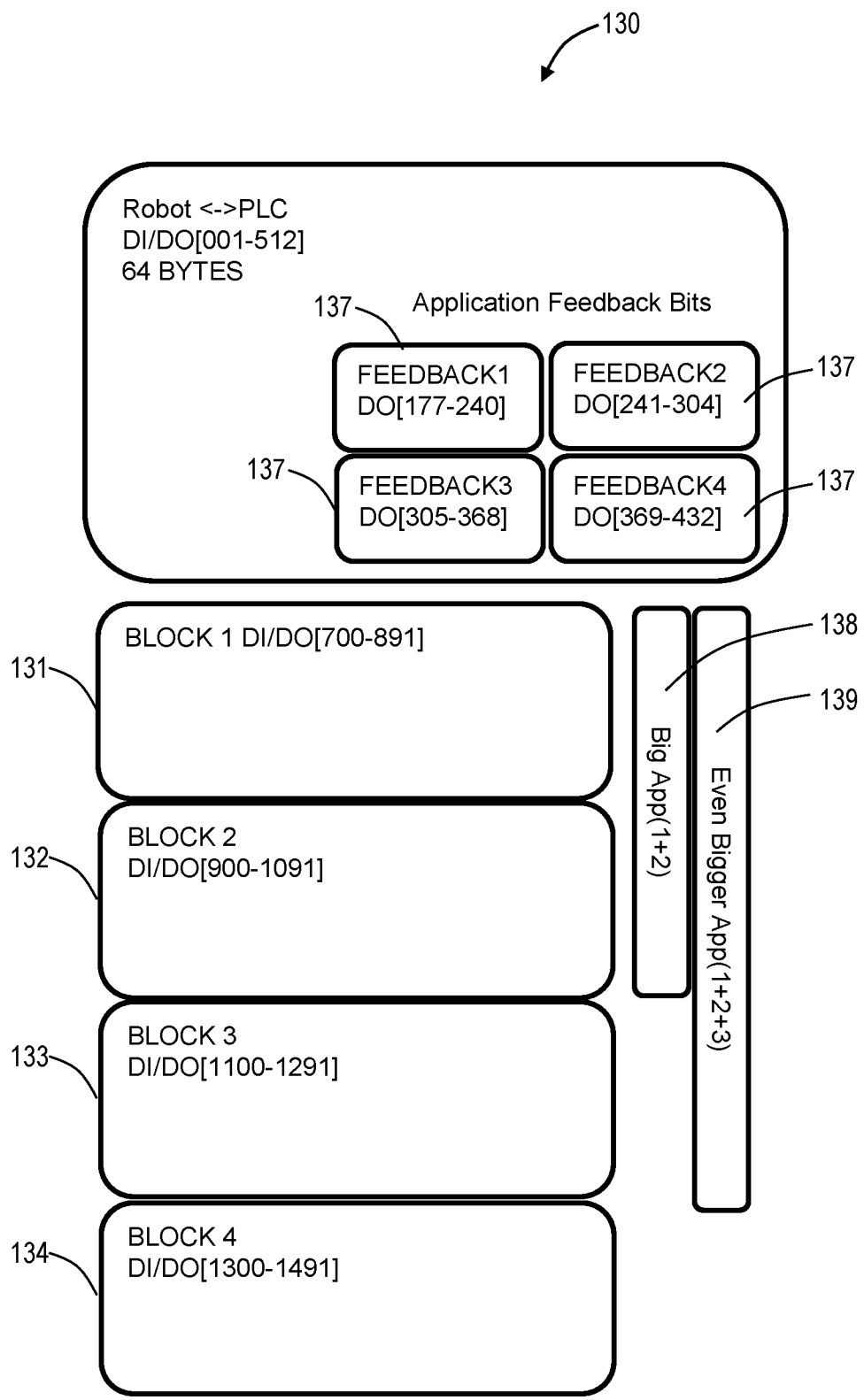
FIG. 2 is a block diagram of one illustrative embodiment of an I/O map for the robot/robot system of the present disclosure.

FIG. 2 is a block diagram of one illustrative embodiment of I/O map 130 for the robot 140/robot system 100 of the present disclosure. Referring to FIG. 2, the I/O map 130 includes definitions for multiple blocks 131, 132, 133, 134 where each block 131, 132, 133, 134 includes predefined inputs and outputs. In embodiments, each block 131, 132, 133, 134 includes a same number of predefined inputs and outputs grouped together.

In the embodiment illustrated, the I/O map 130 defines four blocks 131, 132, 133, 134. In other embodiments, other numbers of blocks, such as six blocks, are defined by the I/O map 130.

In the embodiment illustrated, the I/O map 130 also defines feedback slots 137. Each of the feedback slots 137 is associated with one of the blocks 131, 132, 133, 134. Each of the feedback slots 137 includes standard feedback bits for the associated block 131, 132, 133, 134.

In embodiments, the inputs and outputs are implemented on Ethernet/IP Protocol. In some embodiments, the inputs and outputs are triggered by user signals from a definable time or distance. In embodiments, the robot system 100 is configured to map any inputs and outputs with at least all basic logic operations.

Figure 3:
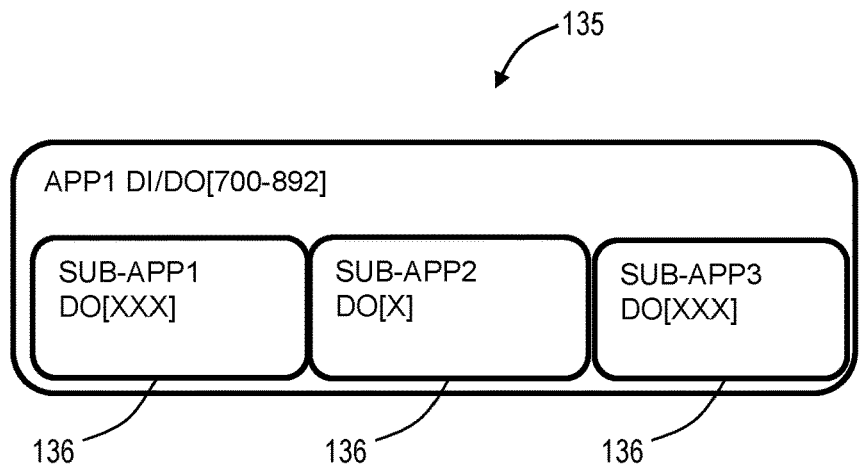
FIG. 3 is block diagram of one illustrative embodiment of an application for the robot of the robot system of the present disclosure.

FIG. 3 is block diagram of one illustrative embodiment of an application 135 for the robot 140 of the robot system 100 of the present disclosure. Referring to FIGS. 2 and 3, one or more applications 135 is installed on the robot 140, such as on the robot controller 146, which are configured to control the components of the robot 140, such as the arm 144 and the tooling 142. In various embodiments, the applications 135 are selected from, for example, a base robot application, a material handling application, a servo spot welding application, a dispensing application, a self-piercing rivet henrob application, an automatic tool changing application, a flow drill screw application, a drawn arc stud application, a clinch application, a mig welding application, a self-piercing stud application, and bolt application, and the like.

Each application 135 is configured to associate with at least one blocks 131, 132, 133, 134. In embodiments, the number of blocks 131, 132, 133, 134 that an application 135 is configured to associate with depends on a number of inputs and outputs needed by the application 135. As illustrated in FIG. 2, a large application 138 is configured to associate with two blocks 131, 132, 133, 134, while an even larger application 139 is configured to associate with three blocks. Upon installation thereof, the large application 138 is then associated with two of the blocks 131, 132, 133, 134 and is configured to utilize the predefined inputs and outputs thereof. Further, upon installation thereof, the even larger application 139 is then associated with three of the blocks 131, 132, 133, 134 and is configured to utilize the predefined inputs and outputs thereof.

In embodiments, one or more of the applications includes sub-applications 136. In some of these embodiments, the sub-applications 136 for a larger application 138 or an even larger application 139 are configured such that each sub-application 136 is associated with a different block 131, 132, 133, 134.

In embodiments, each application 135 is configured to associate with any of the blocks 131, 132, 133, 134, such that the various applications available for use with the robot system 100 are interchangeable and stackable. Thus, a first application 135 is associated with a first block 131 resulting in the first application 135 being configured, based on the association, to operate utilizing the inputs and outputs of the first block 131. Similarly, a second application 135 is associated with the second block 132 resulting in the second application 135 being configured, based on the association, to operate utilizing the inputs and outputs of the second block 132. Similar associations can be made between further applications 135 and the third block 133 and the fourth block 134 or between larger applications 138 and two blocks 131, 132, 133, 134 or even larger application 139 and three blocks 131, 132, 133, 134, and the like. In embodiments, the blocks 131, 132, 133, 134 are associated with applications in the order that the applications are onboarded to the robot 140/robot system 100.

In some embodiments, each block 131, 132, 133, 134 is configured to associate with any of the applications 135. In these embodiments, with each application 135 being configured to associate with any of the blocks 131, 132, 133, 134 and each block 131, 132, 133, 134 being configured to associate with any of the applications 135, the robot system 100 can be dynamically configured where the applications can be dynamically placed and can be positioned within the blocks 131, 132, 133, 134 in any order. Thus, the applications 135 are stackable and interchangeable without modification of the I/O map 130.

In some embodiments, each application 135 includes a base configuration for association with blocks of the I/O map 130.

In embodiments, the robot 140/robot controller 146 is configured to control at least one robot component, such as the arm 144 and the tooling 142, based at least on (1) an I/O map including multiple blocks that are each associated with predefined inputs and outputs, and (2) an application associated with at least one block of the multiple blocks. The application executes the associated predefined inputs and outputs to control the at least one robot component.

In some of these embodiments, each of the multiple blocks is preconfigured (i.e. configured prior to an association being formed between the block and an application) to associate with a single application (i.e. only one application at any given a time).

In some of these embodiments, the control of the at least one robot component is further based on another application being associated with another block of the multiple blocks. This other block is different than the at least one block. The controller utilizes the predefined inputs and outputs defined by this other block to control the at least one robot component while executing this other application.

In some of these embodiments, each of the feedback slots 137 is associated with the same application with which the block that the feedback slot 137 is paired with. In these embodiments, the robot 140/robot controller 146 is configured to provide feedback to the system controller 102 based on the predefined feedback inputs and outputs of the associated feedback slot(s) 137.

In some embodiments, the I/O map 130 includes an overflow. In some of these embodiments, the I/O map 130 is configured to support additional applications, such as two additional applications, via the overflow mapping.

Figure 4:
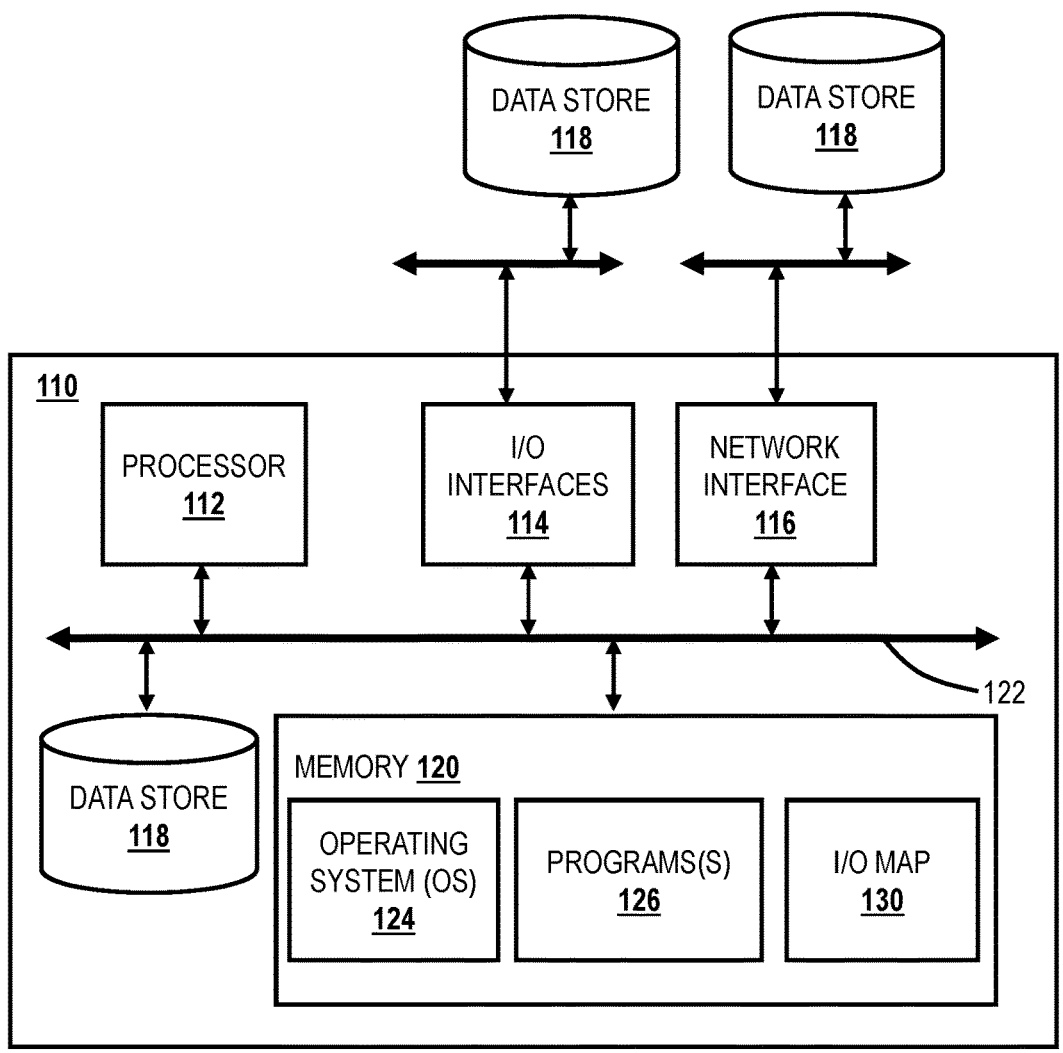
FIG. 4 is a block diagram of one illustrative embodiment of a controller of the robot system of the present disclosure.

FIG. 4 is a block diagram of one illustrative embodiment of a controller 110 of the robot system of the present disclosure. In embodiments, the controller 110 is one of the robot controller 146 and the system controller 102. In embodiments of the robot controller 146, the controller 110 is one of integral to the robot 140 or separate from the robot 140. In embodiments of the system controller 102, the controller 110 is a Programmable Logic Controller (PLC).

In embodiments, the controller 110 is a digital computer that, in terms of hardware architecture, generally includes a processor 112, I/O interfaces 114, a network interface 116, a data store 118, and memory 120. It should be appreciated by those of ordinary skill in the art that FIG. 4 depicts the controller or other processing system 110 in an oversimplified manner, and a practical embodiment may include additional components and suitably configured processing logic to support known or conventional operating features that are not described in detail herein. The components (112, 114, 116, 118, and 120) are communicatively coupled via a local interface 122. The local interface 122 may be, for example, but is not limited to, one or more buses or other wired or wireless connections, as is known in the art. The local interface 122 may have additional elements, which are omitted for simplicity, such as controllers, buffers (caches), drivers, repeaters, and receivers, among many others, to enable communications. Further, the local interface 122 may include address, control, and/or data connections to enable appropriate communications among the aforementioned components.

The processor 112 is a hardware device for executing software instructions. The processor 112 may be any custom made or commercially available processor, a central processing unit (CPU), an auxiliary processor among several processors associated with the server 110, a semiconductor-based microprocessor (in the form of a microchip or chipset), or generally any device for executing software instructions. When the server 110 is in operation, the processor 112 is configured to execute software stored within the memory 120, to communicate data to and from the memory 120, and to generally control operations of the server 110 pursuant to the software instructions. The I/O interfaces 114 may be used to receive user input from and/or for providing system output to one or more devices or components.

The network interface 116 may be used to enable the server 110 to communicate on a network, such as a local area network. The network interface 116 may include, for example, an Ethernet card or adapter (e.g., 10BaseT, Fast Ethernet, Gigabit Ethernet, or or a Wireless Local Area Network (WLAN) card or adapter (e.g., 802.11a/b/g/n/ac). The network interface 116 may include address, control, and/or data connections to enable appropriate communications on the network. A data store 118 may be used to store data. The data store 118 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 118 may incorporate electronic, magnetic, optical, and/or other types of storage media. In one example, the data store 118 may be located internal to the controller 110, such as, for example, an internal hard drive connected to the local interface 122 in the controller 110. Additionally, in another embodiment, the data store 118 may be located external to the controller 110 such as, for example, an external hard drive connected to the I/O interfaces 114 (e.g., a SCSI or USB connection). In a further embodiment, the data store 118 may be connected to the controller 110 through a network, such as, for example, a network-attached file server.

In embodiments, the memory 120 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 120 may incorporate electronic, magnetic, optical, and/or other types of storage media. Note that the memory 120 may have a distributed architecture, where various components are situated remotely from one another but can be accessed by the processor 112. The software in memory 120 may include one or more software programs, each of which includes an ordered listing of executable instructions for implementing logical functions. The software in the memory 120 includes a suitable operating system (O/S) 124 and one or more programs 126. The operating system 124 essentially controls the execution of other computer programs, such as the one or more programs 126, and provides scheduling, input-output control, file and data management, memory management, and communication control and related services. The one or more programs 126 may be configured to implement the various processes, algorithms, methods, techniques, etc. described herein. In embodiments, the programs 126 include the applications 135.

The controller 110 includes at least a portion of the I/O map 130, which defines the inputs and outputs of the multiple I/O slots 131, 132, 133, 134. Once the robot 140/robot system 100 is configured, the controller 110 includes one or more applications 135 stored in the memory 120. Each application 135 is associated with one or more of the I/O slots 131, 132, 133, 134, such that the respective application is configured to utilize the predefined inputs and outputs of the associated one or more of the I/O slots 131, 132, 133, 134 for controlling components of the robot chosen from the arm 144 and the tooling 142.

In some embodiments, the memory storing computer-executable instructions includes an I/O map comprising a plurality of blocks that are each associated with predefined inputs and outputs. The memory the storing computer-executable instructions also includes an application associated with at least one block of the plurality of blocks. When the application is executed, the computer-executable instructions cause the one or more processors to control at least one robot component of the robot utilizing the associated predefined inputs and outputs.

In some embodiments, each of the plurality of blocks is preconfigured to associate with a single application.

In some embodiments, in the memory, another application is associated with another block of the multiple blocks. This other block is different than the at least one block. When this other application is executed, the computer-executable instructions cause the one or more processors to control the at least one robot component utilizing the predefined inputs and outputs of this other block.

In some embodiments, the memory storing computer-executable instructions includes multiple applications including the application. Each of the multiple blocks and each of the multiple applications are modular, such that the multiple applications are stackable and interchangeable where each of the multiple blocks is configured to associate with any of the multiple applications and each of the multiple applications is configured to associate with any of the multiple blocks prior to an association being made between the multiple blocks and the multiple applications in the memory.

In some embodiments, an application, stored in the memory, is configured to associate with two blocks of the I/O map, such that, upon association therewith, the application is configured to utilize the predefined inputs and outputs of each of the two blocks. In other embodiments, an application, stored in the memory, is configured to associate with three blocks of the I/O map, such that, upon association therewith, the application is configured to utilize the predefined inputs and outputs of each of the three blocks.

In some embodiments, the blocks of the I/O map, stored in the memory, are each configured with a same number of inputs and outputs grouped together and each of the one or more applications, stored in the memory, is configured to associate with any of the blocks of the I/O map prior to an association being made between the blocks and the one or more applications in the memory.

In some embodiments, the application includes multiple sub-applications and each of the multiple sub-applications is configured to associate with a different block of the plurality of blocks than other sub-applications of the multiple sub-applications.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 5:
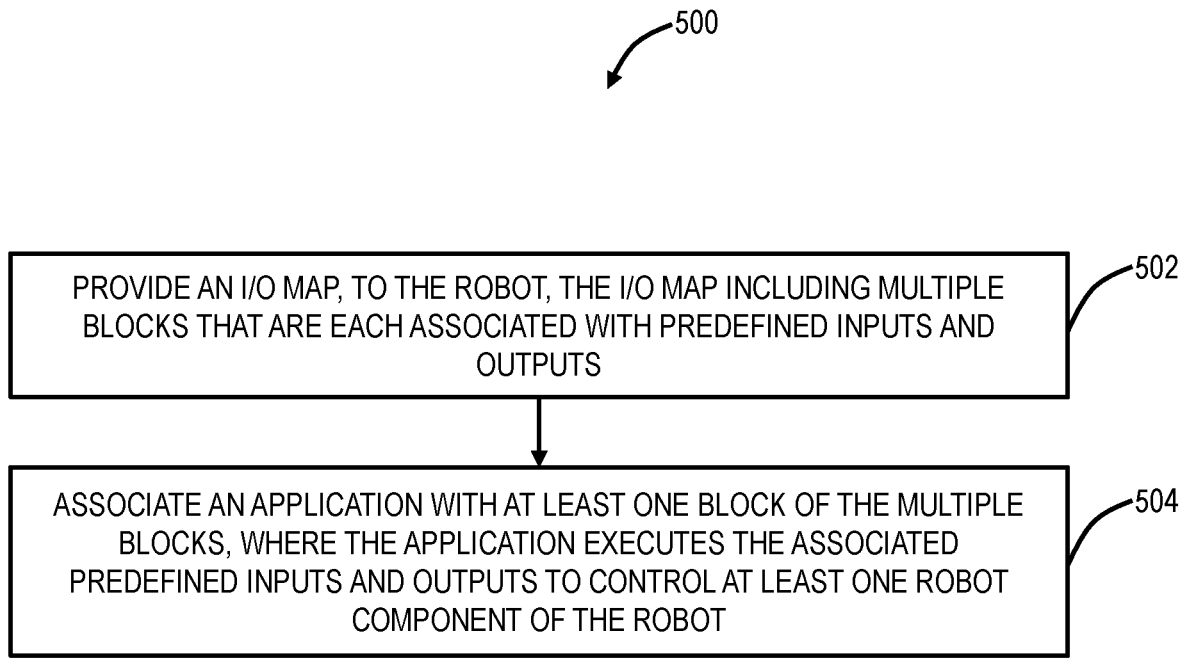
FIG. 5 is a flowchart of one illustrative embodiment of a method for configuring a robot of the robot system of the present disclosure.

FIG. 5 is a flowchart of one illustrative embodiment of a method for configuring a robot 140 of the robot system 100 of the present disclosure. The method includes providing an I/O map, to the robot, the I/O map including multiple blocks that are each associated with predefined inputs and outputs at step 502. In embodiments, the I/O map includes any of the configurations of the I/O map 130 disclosed herein.

The method also includes associating an application with at least one block of the multiple blocks, wherein the application executes the associated predefined inputs and outputs to control at least one robot component of the robot at step 504. In embodiments, associating the application with at least one block includes mapping and configuring the inputs and outputs for the application to match the inputs and outputs of the associated block(s).

In some embodiments, each of the multiple blocks is preconfigured to associate with a single application.

In some embodiments, the method also includes associating multiple applications with the multiple blocks, each being associated with a distinct block of the multiple blocks. Each of the multiple blocks and each of the multiple applications are modular, such that applications of the multiple applications are stackable and interchangeable where each of the multiple blocks is configured to associate with any of the multiple applications and each of the multiple applications is configured to associate with any of the multiple blocks prior to an association being made between the multiple blocks and the multiple applications.

In some embodiments, the method also includes associating multiple applications with the multiple blocks. Each of the multiple applications is associated with a distinct block of the multiple blocks. Each of the multiple blocks and each of the multiple applications are modular, such that applications of the multiple applications are stackable and interchangeable. Thus, each of the multiple blocks is configured to associate with any of the multiple applications and each of the multiple applications is configured to associate with any of the multiple blocks prior to an association being made between the multiple blocks and the multiple applications. While each of the blocks is configured to only associate with one application, each of the blocks can be associated with any of the applications (but only one at any given time).

In some embodiments, the application is configured to associate with two blocks and associating the application with one of the multiple blocks includes associating the application with another of the multiple blocks, such that the application is configured to utilize the predefined inputs and outputs of the one of the multiple blocks and the other of the multiple blocks while being executed to control the at least one robot component. As such, for applications that require more inputs and outputs then what is available by a single block, those applications are associated with multiple applications slots for accommodation thereof. In some of these embodiments, the application is associated with subsequent blocks in the I/O map.

In embodiments, each of the blocks of the I/O map are configured with a same number of inputs and outputs grouped together. In some of these embodiments, the number of inputs and outputs for each block is selected to accommodate four blocks. In other embodiments, the number of inputs and outputs for each block is selected to accommodate a different number of blocks, such as six blocks. In some embodiments, the I/O map includes a dedicated overflow. In some of these embodiments, the dedicated overflow can be re-configured to support extra blocks.

In some embodiments, each of the applications is configured to associate with any of the blocks of the I/O map. In some embodiments, the application includes multiple sub-applications. In some of these embodiments, each of the multiple sub-applications is configured to associate with a different block than other sub-applications. In some of these embodiments, the method includes associating each of the multiple sub-applications with a different block.

In some embodiments, the I/O map further defines multiple feedback slots defining feedback inputs and outputs for communication with a system controller connected to the robot. Each of the multiple feedback slots is paired with a respective one of the multiple blocks. In these embodiments, the method further includes associating the application with the feedback slot paired with each of the at least one blocks.

In some embodiments, the method further includes generating a backup configuration of the robot system prior to initializing the other steps of the method.

In some embodiments, the method further includes configuring each of the applications, one at a time, by selecting each of the applications to be associated with an block(s). In of these embodiments, each application is a standard application selected from a list of applications during the configuration process.

In some embodiments, the method includes analyzing an application before onboarding to ensure the application includes a base configuration for association with blocks of the I/O map.

Although the present disclosure is illustrated and described with reference to illustrative embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A robot, comprising:
    at least one robot component; and
    a controller configured to control the at least one robot component based at least on:
        (1) an Input/Output (I/O) map comprising a plurality of groups of a same number of predefined inputs and outputs; and
        (2) an application associated with at least one group of inputs and outputs of the plurality of groups of inputs and outputs, the application executes inputs and outputs of the at least one group of inputs and outputs to control the at least one robot component according to the at least one group of inputs and outputs of the I/O map.

2. The robot of claim 1, wherein each of the plurality of groups is preconfigured to associate with a single application.

3. The robot of claim 1, wherein the control of the at least one robot component is further based on another application being associated with another group of the plurality of groups, the another group being different than the at least one group, and wherein the controller utilizes the predefined inputs and outputs defined by the another group to control the at least one robot component while executing the another application.

4. The robot of claim 1, wherein the control of the at least one robot component is based on a plurality of applications, and wherein each of the plurality of groups and each of the plurality of applications are modular, such that applications of the plurality of applications are stackable and interchangeable where each of the plurality of groups is configured to associate with any of the plurality of applications and each of the plurality of applications is configured to associate with any of the plurality of groups prior to an association being made between the plurality of groups and the plurality of applications for control of the at least one robot component.

5. The robot of claim 1, wherein each of the plurality of groups is configured with a same number of inputs and outputs grouped together.

6. The robot of claim 1, wherein the application includes multiple sub-applications and each of the multiple sub-applications is configured to associate with a different group of the plurality of groups than other sub-applications of the multiple sub-applications.

7. The robot of claim 1, wherein the controller is configured to receive instructions from a system controller, and wherein the controller is configured to provide feedback thereto based on predefined feedback inputs and outputs paired with the at least one group of inputs and outputs in the I/O map.

8. A controller for a robot, comprising:
    one or more processors; and
    memory storing computer-executable instructions including:
        an Input/Output (I/O) map comprising a plurality of groups of a same number of predefined inputs and outputs, and
        an application associated with at least one group of inputs and outputs of the plurality of groups of inputs and outputs,
        wherein when the application executes inputs and outputs of the at least one group of inputs and outputs, the computer-executable instructions cause the one or more processors to control at least one robot component of the robot according to the at least one group of inputs and outputs of the I/O map.

9. The controller of claim 8, wherein each of the plurality of groups is preconfigured to associate with a single application.

10. The controller of claim 8, wherein, in the memory, another application is associated with another group of the plurality of groups, the another block being different than the at least one group, and wherein when the another application is executed, the computer-executable instructions cause the one or more processors to control the at least one robot component utilizing the predefined inputs and outputs of the another group.

11. The controller of claim 8, wherein the memory storing computer-executable instructions includes a plurality of applications including the application, and wherein each of the plurality of groups and each of the plurality of applications are modular, such that applications of the plurality of applications are stackable and interchangeable where each of the plurality of groups is configured to associate with any of the plurality of applications and each of the plurality of applications is configured to associate with any of the plurality of groups prior to an association being made between the plurality of groups and the plurality of applications in the memory.

12. The controller of claim 8, wherein each of the plurality of groups is configured with a same number of inputs and outputs grouped together.

13. The controller of claim 8, wherein the application includes multiple sub-applications and each of the multiple sub-applications is configured to associate with a different group of the plurality of groups than other sub-applications of the multiple sub-applications.

14. A method for configuring a robot, comprising:
providing an Input/Output (I/O) map, to the robot, the I/O map comprising a plurality of blocks groups of a same number of predefined inputs and outputs; and
associating an application with at least one group of inputs and outputs of the plurality of groups of inputs and outputs,
wherein the application executes inputs and outputs of the at least one group of inputs and outputs to control at least one robot component of the robot according to the at least one group of inputs and outputs of the I/O map.

15. The method of claim 14, wherein each of the plurality of groups is preconfigured to associate with a single application.

16. The method of claim 14, further comprising associating another application with another group of the plurality of groups, the another group being different than the at least one group, wherein control of the at least one robot component while executing the another application utilizes the predefined inputs and outputs defined by the another group.

17. The method of claim 14, further comprising associating a plurality of applications with the plurality of groups, each being associated with a distinct group of the plurality of groups, wherein each of the plurality of groups and each of the plurality of applications are modular, such that applications of the plurality of applications are stackable and interchangeable where each of the plurality of groups is configured to associate with any of the plurality of applications and each of the plurality of applications is configured to associate with any of the plurality of groups prior to an association being made between the plurality of groups and the plurality of applications.

18. The method of claim 14, wherein each of the plurality of groups is configured with a same number of inputs and outputs grouped together.

19. The method of claim 14, wherein the application includes multiple sub-applications and each of the multiple sub-applications is associated with a different group of the plurality of groups than other sub-applications of the multiple sub-applications.

20. The method of claim 14, wherein the I/O map further defines a plurality of feedback slots defining feedback inputs and outputs for communication with a system controller connected to the robot, each of the plurality of feedback slots being paired with a respective one of the plurality of groups, the method further comprising associating the application with the feedback slot paired with each of the at least one groups.

* * * * *